Patented Oct. 2, 1951

2,569,984

UNITED STATES PATENT OFFICE 2,569,984

EXTRACTIVE CRYSTALLIZATION PROCESS

Lloyd C. Fetterly, Seattle, Wash., assignor to Shell Development Company, San Francisco, Calif., a corporation of Delaware No Drawing. Application October 27, 1947, Serial No. 782,449

8 Claims. (Cl. 260—666)

This invention relates to a process for the extractive crystallization of organic compounds. More particularly, it relates to the formation of crystalline complexes between certain crystallizing agents and particular hydrocarbons and to improved processes for their preparation.

The fractionation of mixtures of organic compounds has been carried out by numerous means such as fractional distillation, selective adsorption, fractional crystallization, etc. In many cases, however, the separation of closely allied isomers is difficult due to similarity of physical or chemical characteristics and the isolation of a particularly desired fraction or species from a mixture often is incomplete or is possible only by expensive or uneconomical processes. In numerous conversion operations such as alkylation, isomerization and cyclization, the efficiency is reduced if feed stocks are contaminated with some of the products which the conversion operation is intended to form.

A new method has been investigated for the fractionation of organic compound mixtures, particularly mixtures of petroleum hydrocarbons. This method comprises contacting the mixtures with a selective crystallizing agent which forms crystalline complexes with specific types of molecular configurations. The agents suitable for this process are those having the general configuration

wherein X is an atom selected from the group consisting of oxygen, sulfur and selenium. It has been found that urea forms crystalline complexes with organic compounds having normal, i. e. substantially unbranched structure. However, it was discovered that thiourea was inactive toward this type of structure but formed crystalline complexes with hydrocarbons having branched chains and with saturated cyclic hydrocarbons. Selenourea, on the other hand, appears to be more reactive and at room temperature will form crystalline complexes with numerous types of configurations including the aromatics.

Separation of a particular type of configuration from its mixture with other types has been accomplished successfully by this method. However, numerous complexes so formed have a poor crystalline structure. For example, the crystals often are extremely small and therefore are difficult to filter from a somewhat viscous mixture such as a lubricating oil. Furthermore, the rate at which the crystals are formed is often unduly slow and the "induction period," i. e. that period immediately following contacting the crystallizing agent with the mixture before crystallization commences, also may be unduly prolonged. It was noted that water was a convenient medium for carrying the crystallizing agents, but at temperatures above about 150° F. the agents exhibit appreciable hydrolysis in this medium.

This process of crystalline complex formation has heretofore been carried out as a batch operation. Briefly, the operation has comprised contacting an aqueous solution of the crystallizing agent with a hydrocarbon mixture. This type of operation has been found to have several disadvantages, including those noted above, namely, the induction period is prolonged, the rate of crystal formation is slow and, due to the necessarily extended period of treatment, the hydrolysis of the crystallizing agent is appreciable. However, the most disadvantageous feature of this type of operation is noted during the step wherein the crystalline complexes are separated from the reaction mixture by filtration. Due to the finely divided nature of the crystals, filtration rates are low and consequently the reaction mixture has time to settle into its separate phases, namely an aqueous lower phase and an upper oily phase containing those hydrocarbons which were inert toward the crystallizing agent. Due to this set of circumstances the crystals deposited on the filter are freed first from the aqueous phase and only subsequently from the oily phase. Hence, the crystals are left with a contaminating film of oil adhering to the crystals. While a certain proportion of these contaminating substances may be removed by subsequent washing, the latter operation is not satisfactory in that removal is far from complete and leaves a product having as high as 20–25% of the undesired fraction on the crystals unless excessive amounts of washing are employed.

It is an object of this invention to improve these extractive crystallization processes. It is another object of this invention to provide an improved method for the fractionation, separation and purification of mixtures of organic compounds, particularly petroleum fractions and other hydrocarbons. Other objects will become apparent during the following discussion.

Now, in accordance with this invention, it has been found that numerous operational advantages are gained by contacting a complex-forming agent having the general configuration given above with a feed comprising organic compounds, at least part of which are capable of forming complexes with such agents, in the presence of two liquid media, one of which is substantially miscible with the crystallizing agent and substantially less miscible with the feed, the other liquid medium being one which enhances the miscibility of the feed in the first medium. During this operation at least two phases are maintained, one of which contains the complex forming agent, the other of which contains the mixture being fractionated, a small portion of the latter being made miscible in the first phase by the presence of the solubilizing liquid medium. Still in accordance with this invention it has been found that by conducting the crystalline complex formation as a continuous operation numerous additional advantages are obtained, as more fully described below.

The liquid medium most highly preferred having miscibility with the crystallizing agent but being substantially less miscible with the feed is water. However, other media may be used in addition to or in place of an aqueous phase as long as it possesses similar solubility characteristics and is substantially inert toward the crystallizing agent. The solubilizing medium which enhances the miscibility of the feed in this primary medium may be one having any of three types of solubility characteristics: The solubilizing medium may be highly soluble in the organic mixture and only slightly soluble in water; yet may be highly soluble in water and only slightly soluble in the organic mixture; or it may be substantially soluble in both phases.

The type of solubilizing medium must be chosen to suit particularly the specific mixture of organic compounds being fractionated. When fractionating mixtures of hydrocarbons by this process the most preferred type of solubilizing medium is one having high miscibility with the hydrocarbons and slight miscibility with the aqueous phase which contains the crystallizing agent and which is substantially inert toward the latter. Suitable solvents having these properties include ketones such as methylisopropyl ketone, methylisobutyl ketone, diisopropyl ketone, methyl tertiary butyl ketone, and mesityl oxide; alcohols such as normal butyl, secondary butyl, isobutyl alcohols, pentanol-1, pentanol-2, pentanol-3, 2-methylbutanol-4, 2-methylbutanol-3, 2-methylpentanol-2, 2,2-dimethylpropanol-1, 3-methylbutanol-4, normal hexanol, 3-ethylpentanol-3, 2-ethylhexanol-1 and octanol-1; esters such as diisoamyl acetate; ethers such as diethyl ether; and mixtures of such agents.

Another type of solubilizing medium which may be used during the fractionation of hydrocarbon mixtures should be highly soluble in water and have slight miscibility in the hydrocarbon phase. Suitable solvents of this type include alcohols such as methyl, ethyl, and isopropyl alcohol; ketones such as acetone; ethers such as methyl Cellosolve; certain heterocyclic compounds such as sulfolane, etc.

The third type of solubilizing medium which may be used in carrying out the present invention is substantially miscible with both the aqueous phase and with the hydrocarbon phase. Solvents of this variety include ketones such as methylethyl ketone and acetonyl acetone, as well as alcohols such as diacetone alcohol.

The mixtures of organic compounds which may be treated with urea by the process of the present invention comprise compounds having substantially normal structure and/or compounds having a predominating substituent of substantially normal structure. Conditions may be employed whereby certain normal organic compounds are separated from other normal organic compounds, or from other organic compounds such as isoparaffins, aromatics, naphthenes, etc. The organic compounds of normal structure which may be formed into complexes by the process of the present invention include both saturated and unsaturated compounds, especially the paraffins, and olefins. The normal compounds may be of a number of types, such as hydrocarbons, alcohols, ketones, aldehydes, esters, amines, amides, sulfides, disulfides, mercaptans, acids, halogenated compounds, ethers, nitro-compounds, silicones, carbohydrates, etc. The hydrocarbons respond especially well to the process of the present invention.

Suitable hydrocarbons which form crystalline complexes with urea include the paraffinic hydrocarbons such as butane, pentane, hexane, heptane, octane, nonane, decane, undecane, dodecane, tridecane, tetradecane, pentadecane, hexadecane, heptadecane, octadecane, nonadecane, eicosane, etc.

Olefin hydrocarbons which may be treated by the process of the present invention include 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 2-nonene, 3-nonene, 4-nonene, 1-decene, 2-decene, 3-decene, 5-decene, 1-undecene, 2-undecene, 5-undecene, 1-dodecene, 6-dodecene, 1-tridecene, 6-tridecene, 1-pentadecene, 8-heptadecene, 13-heptacosene, etc.

Another class of hydrocarbons which may be formed into complexes with urea, according to the process of the present invention are the normal diolefins such as 1,2-butadiene, 1,3-butadiene, 1,2-pentadiene, 1,3-pentadiene, 1,4-pentadiene, 1,2-hexadiene, 1,3-hexadiene, 1,4-hexadiene, 1,5-hexadiene, 2,3-hexadiene 2,4-hexadiene, 1,3-heptadiene, 1,6-heptadiene, 2,4-heptadiene, 1,4-octadiene, 1,5-octadiene, 1,7-octadiene, 2,6-octadiene, 3,5-octadiene, 1,5-nonadiene, 1,8-nonadiene, 2,6-nonadiene, 1,3-decadiene, 1,4-decadiene, 1,9-decadiene, 2,8-decadiene, 3,7-decadiene, 2,6-dodecadiene, 1,17-octadecadiene, etc.

Normal hydrocarbons of a greater degree of unsaturation which form crystalline complexes with urea by the process of the present invention include the triolefines, acetylenes, diacetylenes, olefin-acetylenes and the diolefin-acetylenes, including 1,3,5-hexatriene, 1,3,5-heptatriene, 2,4,6-octatriene, ethylacetylene, propylacetylene, butylacetylene, amylacetylene, caprylidene, 4-octyne, diacetylene, propyl-diacetylene, 1,8-nonadiyne, 1-hepten-3-yne, 1,5-hexadien-3-yne, etc.

Normal alcohols, especially those having six or more carbon atoms, may be treated by the present process to form complexes with urea. These include the aliphatic monohydric alcohols, such as hexyl alcohol, heptyl alcohol, octyl alcohol, nonyl alcohol, decyl alcohol, dodecyl alcohol, cetyl alcohol, carnaubyl alcohol, and the polyhydric alcohols, such as ethylene glycol, diethylene glycol, propylene glycol and hexitol.

Ethers of normal structure forming complexes with urea include acetal, paraldehyde, crotonly ether, etc. Aldehydes of normal structure also respond to the process of this invention, including butyraldehyde, valeraldehyde, caproaldehyde, palmitic aldehyde, citral, adipaldehyde, etc. Ketones which form urea complexes are exemplified by 3-hexanone, palmitone, 2,3-pentanedione, etc.

Acids also may be treated according to the subject process. Typical normal acids forming urea complexes are the normal fatty acids, especially those having four or more carbon atoms, such as butyric, valeric, caproic, enanthylic, caprylic, pelargonic, capric, undecylic, lauric, tridecoic, hyristic, pentadecanoic, palmitic, margaric, stearic, etc. acids. Acrylic acids also respond, such as methylacrylic acid and other unsaturated acids as tiglic acid, oleic acid, etc. The acetylene acids form urea complexes. These include sorbic and linolenic acids.

Other types of normal-structured compounds which may be treated according to the process of the present invention include esters, such as amyl acetate, ethyl stearate, etc.; amines such as n-decyl amine, dibutyl amine and triethyl amine; amides, such as stearamide; mercaptans, such as heptyl mercaptan; and other organic compounds of normal structure, including halogenated derivatives of the above compounds, thioalcohols, alkyl hydrazines, thioaldehydes, amino acids, nitroparaffins, halogenated paraffins, etc.

The mixtures containing the organic compounds of normal structure may be composed solely of mixed normal compounds, or they may contain materials substantially inert toward urea, such as branched paraffins, isoolefins, aromatics, cycloparaffins, etc. Usually, especially when treating natural products such as petroleum, the inert ingredients are present as isomers of the normal structure compounds, and may occur therewith naturally or by reason of some treatment to which the organic material has been subjected, such as alkylation, cyclization, isomerization, etc. However, active or inert diluents or solvents may be added to normal organic compounds in order to modify the type and degree of crystallization of the latter with urea. The reason for and use of diluents is discussed hereinafter.

The following substances, while not of straight-chain configuration, have been found to form complexes with urea: quinoline, 2,4,6-trimethylpyridine, thiophene, diisopropylamine, 1,3-dimethylbutylamine, nitropropane, 2-methylpyridine, cetyl bromide, n-propyl iodide, methyl-n-amyl ketone, chloroform, trimethylene bromide, tetrachloroethylene, methylchloroform, ethylidene chloride, iodobenzene and dioxane.

Hydrocarbons which form complexes with thiourea are those having a predominating member which is a substantially branched radical or a naphthene radical, such as alkaryl hydrocarbons wherein at least one alkyl group is an isoparaffin radical of about six or more carbon atoms.

Isoparaffins which form complexes with thiourea include isobutane, isopentane, 2,2-dimethylpropane, isohexane, 2,3 - dimethylbutane, 2-methylpentane, 3-methylpentane, 2-ethylbutane, 2-ethylpropene, 1,1 - dimethylpentane, 1,2-dimethylpentane, 1,3 - dimethylpentane, 1,4 - dimethylpentane, 2-ethylpentane, 3-ethylpentane, 2-n-propylbutane, 2-isopropylbutane, 2-methylhexane, 3-methylhexane, 2,2-dimethylpentane, 2,3-dimethylpentane, 2,4-dimethylpentane, 3,3-dimethylpentane, 2,2,3 - trimethylbutane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2,2,3-trimethylheptane, 2,2,4-trimethylpentane, 2,3,3-trimethylpentane, 2,3,4-trimethylpentane, 2,2,3,3-tetramethylbutane, 2-methyl-3-ethylpentane, 3-methyl-3-ethylpentane, 2-methyloctane, 3-methyloctane, 4-methyloctane, 2,2-dimethylheptane, 2,3-dimethylheptane, 2,4-dimethylheptane, 2,5-dimethylheptane, 2,6-dimethylheptane, 3,3-dimethylheptane, 3,4-dimethylheptane, 3-ethylheptane, 4-ethylheptane, 2,2,3-trimethylhexane, 2,2,4-trimethylhexane, 2,2,5-trimethylhexane, 2,2,5-trimethylhexane, 2,2,5-trimethylhexane, 2,3,3-trimethylhexane, 2,3,5-trimethylhexane, 2,4,4-trimethylhexane, 3,3,4-trimethylhexane, 2-methyl-3-ethylhexane, 2-methyl-4-ethylhexane, 2,2,3,3-tetramethylheptane, 2,2,4,4-tetramethylpentane, 3,3 - diethylpentane, 2,2-dimethyl-3-ethylpentane, 2,3-dimethyl-3 - ethylpentane, 2,4-dimethyl-3-ethylpentane, 2,2,3,4-tetramethylpentane, 2-methylnonene, 3-methylnonane, 4-methylnonane, 5-methylnonane, 2,2-dimethyloctane, 2,3 - dimethyloctane, 2,4 - dimethyloctane, 2,5-dimethyloctane, 2,6-dimethyloctane, 2,7-dimethyloctane, 3,3-dimethyloctane, 3,4-dimethyloctane, 3,6-dimethyloctane, 4,5-dimethyloctane, 3-ethyloctane, 2,2,3-trimethylheptane, 2,3,3-trimethylheptane, 2,2,6-trimethylheptane, 2,3,6-trimethylheptane, 2,4,4-trimethylheptane, 2,4,6-trimethylheptane, 3,3,5-trimethylheptane, 3-methyl-3-ethylheptane, 4-propylheptane, 4 - isopropylheptane, 2,2,3,3-tetramethylhexane, 2,2,3,4-tetramethylhexane, 2,2,5,5-tetramethylhexane, 2,2 - dimethyl - 4 - ethylhexane, 3,3,4,4 - tetramethylhexane, 3,3 - diethylhexane, 3,4 - diethylhexane, 2,2,4 - trimethylheptane, 2,2,4,5-tetramethylhexane, 2-methyl-5-ethylheptane, 4-methyldecane, 5-methyldecane, 2,3-dimethylnonane, 2,4 - dimethylnonane, 2,5 - dimethylnonane, 2,6 - dimethylnonane, 3,3 - dimethylnonane, 4-ethylnonane, 5-ethylnonane, 2,3,7 - trimethyloctane, 2,4,7 - trimethyloctane, 2,2,3,3-tetramethylheptane, 2,2,4 - trimethyloctane, 2,2,4,6-tetramethylheptane, 2,2,4,5-tetramethylheptane, 3-methylundecane, 4-methylundecane, 2,3-dimethyldecane, 2,5-dimethyldecane, 2,6 - dimethyldecane, 2,9 - dimethyldecane, 3-ethyldecane, 5 - propylnonane, 2,2,7,7 - tetramethyloctane, 2,3,6,7-tetramethyloctane, 2,4,5,7-tetramethyloctane, 3,3,6,6-tetramethyloctane, 2-methyl-5-propyloctane, 3,6-diethyloctane, 2,6-dimethyl-3-isopropylheptane, 4,5-diethyloctane, 2,2,4,6,6 - pentamethylheptane, 2,2,4,4,6 - pentamethylheptane, 5 - methyldodecane, 2,10 - dimethylundecane, 2,5,9-trimethyldecane, 4-propyldecane, 4-ethylundecane, 5-butylnonane, 2,11-dimethyldodecane, 4,5 - diisopropyloctane, 2,7-dimethyl-4,5-diethyloctane, 4 - propylundecane, 2,7-dimethyl-4-isobutyloctane, 2,6,10-trimethyldodecane, 2,6,11-trimethyldodecane, 6-methyl-7-ethyldodecane, 5-propyldodecane, 6-propyldodecane, 4-methyl-6-propylundecane, 6,9-dimethyltetradecane, 7,8-dimethyltetradecane, 3-ethyltetradecane, 5,7-diethyldodecane, 2,6,7,11-tetramethyldodecane, 4,7-dipropyldecane, 2,2,3,3,6,6,-7,7-octamethyloctane, 3,12-diethyltetradecane, 2,6,11 - trimethyl - 9 - isobutyldodecane, 2,6-dimethyloctadecane, 5,7,9-triethyltetradecane, 2-methyl-4-isobutylhexadecane, 2,9-dimethyl-5,6-diisoamyldecane, 4,8,13,17 - tetramethylicosane, 2,11-dimethyl-5,8-diisoamyldodecane, 10-nonylnonadecane, 2,6,10,14,18,22-hexamethyltetracosane, 2,6,12,16-tetramethyl - 9 - (2,6 - dimethyloctyl heptadecane, etc.

As stated hereinbefore another type of hydrocarbon which readily forms complexes with thiourea is that of the naphthenes. Typical species of this group include cyclopropane, methylcyclopropane, 1,1 - dimethylcyclopropane, 1,2 - dimethylpropane, ethylcyclopropane, 1,1,2 - trimethylcyclopropane, 1,2,3 - trimethylcyclopropane, 1-methyl-2-ethylcyclopropane, propylcyclopropane, 1-methyl-2-propylcyclopropane, cyclobutane, methylcyclobutane, ethylcyclobutane, 1,2-dimethylcyclobutane, propylcyclobutane, isopropylcyclobutane, 1,2 - diisopropylcyclobutane, 1,2-dimethyl - 3,4 - diethylcyclobutane, 1,1,2,2-tetramethyl-3,4 - diisopropylcyclobutane, cyclopentane, methylcyclopentane, 1,1-dimethylcyclopentane, 1,2-dimethylcyclopentane, 1,3-dimethylcyclopentane, ethylcyclopentane, propylcyclopentane, isopropylcyclopentane, 1,1,3-trimethylcyclopentane, 1-methyl-2-ethylcyclopentane, 1-methyl-3-ethylcyclopentane, butylcyclopentane, isobutylcyclopentane, 1-methyl-2 - propylcyclopentane, 1-methyl-3-propylcyclopentane, 1,3-dimethyl-2-ethylcyclopentane, 1,3 - dimethyl - 5- ethylcyclopentane, 1,1 - diethylcyclopentane, amylcyclopentane, isoamylcyclopentane, 2-cyclopentylpentane, 1-methyl-3-butylcyclopentane, 1-methyl-2,5-diethylcyclopentane, 1,2,3-trimethyl-4-isopropylcyclopentane, heptylcyclopentane, cyclohexane, methylcyclohexane, ethylcyclohexane, 1,1-dimethylcyclohexane, 1,2-dimethylcyclohexane, 1,3-dimethylcyclohexane, 1,2,3-trimethylcyclohexane, 1,3,5-trimethylcyclohexane, butylcyclohexane, 1-methyl-4-ethylcyclohexane, 1-methyl-3-propylcyclohexane, 1-methyl-3 - isopropylcyclohexane, 1,3-dimethyl - 5 - ethylcyclohexane, 1,3-diethylcyclohexane, amylcyclohexane, pentamethylcyclohexane, 1,2-dimethyl-3,6-diethylcyclohexane, 4-cyclohexylheptane, 3-cyclohexyl-3 - ethylpentane, triisopropylcyclohexane, 2,8-dimethyl-5-ethyl-5-cyclohexylnonane, 1-methyl-4 - isopropyl - 2 - dodecylcyclohexane, octadecylcyclohexane, propylcycloheptane, etc.

Specific and exceptional examples of other compounds forming complexes with thiourea include cyclohexanol, cyclohexanone, p-methylcyclohexanol, dimethallyl ether, 2,4,6-trimethylpyridine, chlorobenzene, chlorocyclohexane and cyclohexylamine.

In forming crystalline complexes by the method of the present invention the mixture to be fractionated is contacted with the two phases described, preferably an aqueous solvent for the crystallizing agent and a solubilizing medium such as those enumerated hereinbefore. Preferably the solubilizing medium should be present in a quantity at least equal to that of the mixture to be fractionated. The solvent containing the crystallizing agent should be substantially saturated therewith at the temperature of complex formation. The complexes formed by the operation described ordinarily contain approximately three molecules of the crystallizing agent for every four carbon atoms of the organic compound in complex formation with it. However, this ratio may vary, depending upon the conditions of the complex formation. The crystalline complexes formed are relatively unstable and can be decomposed to yield the crystallizing agent in its original form and the organic compound such as a normal hydrocarbon. Preferred means for decomposing the complexes include heating the latter in the presence of water at an elevated temperature between about 100 and 175° F. By this operation the complexes are destroyed, the crystallizing agent dissolving in the water and the organic compound forming a separate phase which may be easily separated from the aqueous solution.

By carrying out the crystalline complex formation according to the method of the present invention several advantages are gained including the formation of complexes having improved crystal structure. This enables their easy separation from the other components of the reaction mixture. Furthermore, the rate of crystal formation is increased and the induction period becomes shorter, while the hydrolysis of the crystallizing agent is appreciably reduced.

As noted hereinbefore, this process is still further improved by conducting it on a continuous basis. Preferred means comprise introducing an aqueous solution of the crystallizing agent and the mixture of organic compounds to be fractionated near the bottom of a vertical tower fitted with a stirring rod throughout its length. Preferably the stirring rod has horizontal arms situated at points throughout its length and still more preferably, these horizontal arms are fitted with fins designed to create the maximum turbulence in the vessel. It was discovered that by use of this apparatus the induction period could be reduced to as little as 1/60 of that necessary when the operation was carried out as a batch process. The reason for this is not clear although the beneficial effect of undried, i. e. wet, crystals has been noted. Furthermore, it was discovered that the temperature of the complex formation could be raised as much as 15 degrees F. and that, therefore, refrigeration was usually unnecessary since temperatures of about 90° F. and sometimes as high as 100° F. gave satisfactory results. One of the most important advantages gained from the use of a continuous operation was in the filtration step, wherein the crystalline complexes were continuously separated from the liquid components of the reaction mixture. It was noted that the crystalline structure of the complex which was formed during a continuous operation was such that rapid filtration was possible and the oily phase was prevented from rising to the top of the filter and contaminating the crystalline product. This improvement was particularly advantageous in that products having a purity of 99% or higher of the desired ingredients could be obtained. Purity of product is also improved by use of high filtration rates.

The following examples illustrate the use of the present process:

*Example I*

Sixty-seven parts by weight of urea was dissolved in 50 parts of water to form a solution saturated at 80° F. A petroleum lubricating oil fraction containing about 14.6% normal paraffin hydrocarbons was mixed with an equal volume of methylisobutyl ketone. Two parts by volume of the diluted oil was mixed with five parts by volume of the urea solution at 80° F. for twenty minutes. During this period the mixture contained two liquid phases. Due to a slight heat of reaction caused by the formation of crystalline complexes of urea and the normal paraffins, the agitated mixture was cooled in order to maintain the initial temperature.

Crystalline complexes having well-defined structure were formed during the mixing. The slurry was passed to a rotary filter where separation of the crystals from the liquid phases was readily effected. The filter cake was washed with methylisobutyl ketone in order to remove residual oil from the crystal surfaces.

The raffinate oil, comprising the original oil minus its normal paraffin content, was sent to a recovery zone, aqueous urea solution being separated therefrom by settling and methylisobutyl ketone being removed by flash distillation.

The crystalline complexes were mixed with the aqueous urea solution previously separated from the raffinate oil and heated to a temperature of 140° F. During the heating period of 5 minutes the complexes decomposed, the urea being liberated and dissolving in the aqueous phase, while the liberated oil formed a separate phase. The oil contained methylisobutyl ketone which had been occluded on the crystalline complex. The aqueous phase was removed by settling and the ketone was flashed off, leaving an oil which proved to have a normal paraffin content of about 80%.

Example II

Forty-three parts by weight of urea was dissolved in fifty parts by weight of a mixture of water and methanol having a volumetric ratio of 4 to 1 to form a solution saturated at 75° F. One part by volume of a straight run stove oil containing about 15% normal paraffins was mixed with five parts by volume of the aqueous alcoholic urea solution. The mixture contained two liquid phases which were agitated together for 60 minutes at 75° F. during which time crystalline complexes of urea and normal hydrocarbons were formed. The crystals were filtered off and washed with 6 parts by volume of pentane. The normal paraffins were regenerated from their complexes as described in Example I, a product of about 75% purity being obtained.

Example III

Equal volumes of methylisobutyl ketone and of a mineral lubricating oil fraction containing about 15% normal paraffin were continuously introduced into the bottom of a vertical tower. The tower contained a stirring rod having finned projections at intervals throughout the length of the tower. Simultaneously with the oil addition, 5 parts of an aqueous solution of urea saturated at 90° F. was continuously introduced near the bottom of the tower. Crystallization of the complexes commenced almost immediately at 90° F. after introduction of the components into the tower.

A continuous overflow of the slurry so formed passed to a rotary filter. The normal paraffins were separated from their complexes and recovered as described in Example I. The product so obtained comprised 99% of normal paraffin hydrocarbon.

Example IV

Sixty parts by weight of urea was dissolved in 50 parts by weight of a mixture of water and methanol having a volumetric ratio of 6:1 thus forming a solution saturated at 85° F. One part by volume of a mineral lubricating oil fraction was diluted with one part by volume of methylisobutyl ketone and then reacted at 85° F. with five parts by volume of the methanol-water-urea solution. The complexes so formed were treated by the procedure described in Example I to decompose the complex and recover the normal paraffins.

I claim as my invention:

1. A process for separating straight-chain hydrocarbons from a hydrocarbon mixture containing straight-chain and non-straight-chain hydrocarbons and boiling within the boiling range of gasoline and lubricating oil which comprises treating said mixture in liquid phase at a temperature below about 100° F. with an aqueous solution of urea and in the presence of methyl isobutyl ketone and forming crystalline molecular complexes of urea and straight-chain hydrocarbons, said ketone being present in a volume at least equal to that of the hydrocarbon mixture.

2. A method of separating substantially straight-chain petroleum hydrocarbons from petroleum lubricating oil containing straight-chain and non-straight-chain hydrocarbons by crystalline molecular complex formation, comprising subjecting said oil to the action of urea in an agitated aqueous medium at a temperature below about 100° F., and adding methyl isobutyl ketone to said oil and aqueous medium in a volume at least equal to that of the oil.

3. In the process for the fractionation of a hydrocarbon mixture containing straight-chain and non-straight-chain hydrocarbons wherein crystalline molecular complexes are formed between urea and straight-chain hydrocarbon fractions of said mixture, the improvement which comprises forming said complexes in the presence of an aqueous urea solution and methyl isobutyl ketone, the volume of said ketone being at least equal to that of said hydrocarbon mixture.

4. The process which comprises contacting a petroleum hydrocarbon oil containing straight-chain and non-straight-chain hydrocarbons and at least an equal volume of methyl isobutyl ketone with an aqueous solution of urea, agitating the two-liquid phase system thus formed, whereby molecular complexes of urea and straight-chain petroleum hydrocarbons crystallize, and separating said complexes from the liquid phases.

5. A process for separating straight-chain hydrocarbons from a hydrocarbon mixture containing straight-chain and non-straight-chain hydrocarbons and boiling within the boiling range of gasoline and lubricating oil which comprises treating said mixture in liquid phase at a temperature below about 100° F. with an aqueous solution of urea and in the presence of an isoalkanone to form crystalline complexes of urea and straight-chain hydrocarbons, said ketone being present in a volume at least equal to that of the hydrocarbon mixture.

6. A process for separating straight-chain organic compounds from their mixture with non-straight-chain organic compounds, said mixture being water-insoluble, which comprises treating said mixture with an aqueous solution of urea to form crystalline complexes of urea and said straight-chain organic compounds, said treatment being carried out in the presence of at least one ketone selected from the group consisting of mono-olefinic unsaturated aliphatic ketones, substituted alkyl ketones containing only hydrogen, oxygen and carbon and wherein the non-ketonic oxygen atoms are combined with hydrogen atoms in hydroxy groups, and alkyl ketones which do not form complexes with urea under the operating conditions, the volume of said ketone being at least equal to that of the organic mixture.

7. A process for separating straight-chain organic compounds from their mixture with non-straight-chain organic compounds, said mixture being water-insoluble, which comprises treating said mixture with an aqueous solution of urea to form crystalline complexes of urea and said straight-chain organic compounds, said treatment being carried out in the presence of an isoalkanone having from 5 to 7 carbon atoms, the volume of said isoalkanone being at least equal to that of the organic mixture.

8. A process for separating straight-chain hydrocarbons from a hydrocarbon mixture containing straight-chain and non-straight-chain hydrocarbons and boiling within the boiling range between gasoline and lubricating oil which comprises treating said mixture in liquid phase at a temperature below 100° F. with an aqueous solution of urea in the presence of at least one ketone selected from the group consisting of mono-olefinic unsaturated aliphatic ketones, substituted alkyl ketones containing only hydrogen, oxygen and carbon and wherein the non-ketonic oxygen atoms are combined with hydrogen atoms in hydroxy groups, and alkyl ketones which do not form complexes with urea under the operating conditions to form crystalline complexes of urea and straight-chain hydrocarbons, said ketone being present in an amount at least equal in volume to that of the hydrocarbon mixture.

LLOYD C. FETTERLY.

REFERENCES CITED

The following references are of record in the file of this patent:

UNITED STATES PATENTS

| Number | Name | Date |
| --- | --- | --- |
| 1,830,859 | Schotte et al. | Nov. 10, 1931 |
| 2,059,273 | Piggott | Nov. 3, 1936 |
| 2,108,113 | Eisenmann | Feb. 15, 1938 |
| 2,109,941 | D'Alelio et al. | Mar. 1, 1938 |
| 2,131,127 | Ter Horst | Sept. 27, 1938 |
| 2,145,242 | Arnold | Jan. 31, 1939 |
| 2,174,239 | Gleason | Sept. 26, 1939 |
| 2,249,183 | Simons | July 15, 1941 |
| 2,300,134 | Priewe | Oct. 27, 1942 |
| 2,321,544 | Dittmar et al. | June 8, 1943 |
| 2,376,008 | Riethof | May 15, 1945 |

FOREIGN PATENTS

| Number | Country | Date |
| --- | --- | --- |
| 6,771 | Great Britain | of 1901 |
| 785,765 | France | May 27, 1935 |

OTHER REFERENCES

Atkins et al.: "J. Chem. Soc." (London), vol. 101 (1912), pages 1988 to 1991.

Reynolds: "J. Chem. Soc." (London), vol. 59, Trans. (1891), pages 387 to 392.

Taylor: "J. Chem. Soc." (London), vol. 111 (1917), pages 657 to 660.

Singh et al.: "J. Chem. Soc." (London), vol. 119 (1921), pages 210 and 211.

Perktold: "Monat. für Chemie," vol. 561 (1930), page 248.

Roberts et al.: "Chemical Abstracts," vol. 33 (1930), page 6449.

Bengen: Photostat of Tech. Oil Mission Reel 143, May 22, 1946.